(12) United States Patent  
Klimes (10) Patent No.: US 8,240,780 B1  
(45) Date of Patent: Aug. 14, 2012

(54) HYDRAULIC BRAKE BOOSTER

(75) Inventor: Milan Klimes, Niles, MI (US)

(73) Assignee: Robert Bosch GmbH, Stuttgart (DE)

( * ) Notice: Subject to any disclaimer, the term of this patent is extended or adjusted under 35 U.S.C. 154(b) by 727 days.

(21) Appl. No.: 12/323,518

(22) Filed: Nov. 26, 2008

(51) Int. Cl.
*B60T 8/44* (2006.01)

(52) U.S. Cl. .................................. 303/114.1; 303/113.4

(58) Field of Classification Search .............. 188/151 R, 188/152, 355, 358, 359, 360; 303/114.1, 303/115.1, 115.2, 115.4, 115.5, 20, 155, 303/113.4; 60/545
See application file for complete search history.

(56) References Cited

U.S. PATENT DOCUMENTS

| | | | |
|---|---|---|---|
| 4,199,948 A | 4/1980 | Mathues et al. | |
| 4,311,085 A | 1/1982 | Runkle | |
| 4,341,076 A | 7/1982 | Steffes | |
| 4,667,476 A * | 5/1987 | Takata et al. ................... | 60/545 |
| 5,022,716 A * | 6/1991 | Siegel et al. .................. | 303/155 |
| 5,098,171 A * | 3/1992 | Siegel ........................ | 303/113.4 |
| 5,658,055 A * | 8/1997 | Dieringer et al. .......... | 303/114.3 |
| 5,943,863 A | 8/1999 | Jordan | |
| 6,007,160 A * | 12/1999 | Lubbers et al. ............ | 303/114.1 |
| 6,386,087 B2 * | 5/2002 | Takayama et al. ............. | 91/367 |
| 6,729,450 B1 * | 5/2004 | Albert et al. .................. | 188/359 |
| 6,744,360 B2 * | 6/2004 | Fulks et al. ................... | 340/479 |
| 6,758,041 B2 * | 7/2004 | Bishop et al. .................. | 60/545 |
| 7,008,024 B2 | 3/2006 | Piel et al. | |
| 7,127,891 B2 * | 10/2006 | Ohlig et al. ................. | 60/547.1 |
| 7,823,384 B2 * | 11/2010 | Ikeda et al. .................... | 60/545 |
| 2004/0050045 A1 * | 3/2004 | Bishop et al. .................. | 60/545 |
| 2004/0079222 A1 * | 4/2004 | Hoffmann et al. ................ | 91/1 |
| 2008/0229740 A1 * | 9/2008 | Ikeda et al. .................... | 60/545 |

* cited by examiner

*Primary Examiner* — Bradley King
*Assistant Examiner* — Nicholas J Lane
(74) *Attorney, Agent, or Firm* — Maginot, Moore & Beck (57) ABSTRACT

A supply valve (40), a relief valve (42) and a microprocessor (46) control the supply of pressurized hydraulic fluid from a dedicated pressure source (12) to a brake boost piston (18, 60, 108) interposed between an operator brake pedal (22) input member (20, 106) and a master cylinder. Transducers (48, 50, 102) sense a current relationship between the input member (20, 106) and the boost piston (18, 60, 108) and supply the microprocessor (46) with a input to accordingly operate the supply valve (40) and relief valve (42). In one embodiment, a single transducer (102) senses relative motion between the input member and the piston while in a second embodiment, a single transducer (48) senses the force exerted on the piston by the input member and a third embodiment first and second transducers (48, 50) to sense relative motion between the input member and the piston.

17 Claims, 6 Drawing Sheets

HYDRAULIC BRAKE BOOSTER

BACKGROUND OF THE INVENTION

1. Field of the Invention

The present invention relates to a brake booster system and more particularly to an improved technique for controlling hydraulic boost in response to vehicle operator pedal input.

2. Description of the Related Art

Vehicle braking systems have evolved from simple mechanical brakes to hydraulic brakes and then to power assisted braking systems to reduce a driver's brake pedal effort. Many power assisted braking systems rely on the manifold vacuum created by the engine pistons as they draw air into the engine. A common power brake mechanism such as disclosed on U.S. Pat. No. 5,943,863 employs a housing that is intermediate an operator brake actuating pedal mechanism and a master cylinder. When this brake mechanism is enabled, fluid pressure is supplied to individual wheel brake cylinders or actuators. The housing includes a piston or diaphragm normally exposed on both sides to vehicle manifold vacuum. When the operator actuates the brake pedal, atmospheric pressure is admitted to one side of the piston supplying additional force to the master cylinder piston and enhanced brake line pressure to the individual wheel cylinders. Vehicle braking is still possible in the event of vacuum source failure since operator applied pedal force (without boost) is transmitted to the master cylinder through the boost mechanism.

Hydraulic rather than pneumatic brake boosters have also been proposed. For example, U.S. Pat. No. 4,311,085 utilizes a power steering pump as a source of pressurized hydraulic fluid to provide a power assist during a brake application. This hydraulic brake booster includes a housing which communicates with the pressure source. A control valve within the housing is operable to control the communication of fluid pressure through the housing. In order to operate the control valve, an input member coupled to an operator actuable brake pedal extends into the housing and is movable during a brake application to impart movement to the control valve. Movement of the control valve communicates fluid pressure to a pressure chamber wherein an output member is movable in response to the fluid pressure to effect a power-assisted brake application. The output member is coupled to a conventional brake system master cylinder of which U.S. Pat. No. 4,341,076 may be considered to be typical system.

More recently, electronic control of the valve which applies pressure fluid to the booster has been suggested. U.S. Pat. No. 6,007,160, for example, teaches a method of controlling the operation of an electrohydraulic brake booster to achieve a desired pedal feel. This patent also suggests a power steering pump as a boost pressure source. Brake pedal applied force or the distance the brake pedal travels is monitored by an electronic controller which, in turn, opens or closes a pressure control valve to increase or decrease boost. The method includes sensing brake pedal movement from a fully retracted rest position before a significant resistance to travel of the brake pedal is developed and generating a command pulse that results in application of pressurized hydraulic fluid to the boost piston assembly sufficient to overcome preloaded spring forces and seal friction in the boost piston assembly that would otherwise tend to resist further brake pedal travel. A variable resistance or linear variable displacement transducer are suggested as sensing devices. The method further includes providing a control signal override when a brake pedal "bounce" condition is detected to avoid undesired vehicle braking. A brake pedal bounce condition may occur if the brake pedal is released suddenly so that the brake pedal returns to the fully retracted rest position rapidly enough to bounce off of a mechanical stop at that position and move in the brake apply direction. The patent acknowledges earlier similar systems. Combined hydraulic and pneumatic systems have also been suggested in the prior as disclosed in U.S. Pat. Nos. 4,199,948 and 7,008,024.

SUMMARY OF THE INVENTION

The present invention takes advantage of a lost motion coupling between an operator brake input and a hydraulic boost piston and provides the advantages of a conventional vacuum boost system without the disadvantages thereof.

The invention comprises, in one form thereof, a hydraulically boosted vehicle brake system having an operator controlled input member and a master cylinder operable by the input member. A power boost piston is interposed between the input member and master cylinder for enhancing operator applied force to the master cylinder. A valve assembly selectively supplies pressure fluid from a pressure source to the power boost piston. A sensor arrangement determines relative motion between the input member and the boost piston and an electronic control unit responds to the sensor arrangement to control the valve assembly. The sensor arrangement may include two piezoelectric sensors to respectively identify an operator request for additional braking torque and an operator request for reduced braking torque. In another form, the sensor arrangement includes a linear travel sensor to respectively identify motion of an input member motion toward the boost piston indicative of an operator request for additional braking torque and input member motion away from the boost piston indicative of an operator request for reduced braking torque.

The invention discloses a method of supplying hydraulic boost pressure to a vehicle brake system by monitoring the relative axial relationship between the input member and power boost piston by increasing boost pressure to the power boost piston when the input member is urged toward the power boost piston and decreasing boost pressure to the power boost piston when the input member is urged away from the power boost piston, and maintaining the boost pressure constant when the relative axial relationship remains constant. The monitoring may include sensing for variations in the relative linear displacement between the input member and the power boost piston, or sensing for variations in the force exerted by the input member on the power boost piston.

An advantage of the present invention is that many features of conventional braking systems are retained. The reaction force and gain principle are essentially the same as in a conventional actuation system. There is the same failed boost performance as conventional actuation system. An active boost function is available to support pressure build during an ESP event and the system can be used as an actuator for regenerative brake systems (RBS). A high flow master cylinder is not required. In one form, the system is interchangeable with standard booster to cover a wide range of vehicle platform variations. The system may use known ABS valves, pump and controller technology. Input force from the pedal is transferred to the master cylinder to build pressure, the same as on conventional brake systems.

Other advantages include short packaging and ease of assembly due to a minimum number of component parts. There are no dynamic seals under permanent high pressure and as a result a relatively lower booster pressure is needed than in the prior art boosters.

BRIEF DESCRIPTION OF THE DRAWINGS

Corresponding reference characters indicate corresponding parts throughout the several drawing views of the brake system according to the invention.

DETAILED DESCRIPTION OF THE INVENTION

Figure 1:
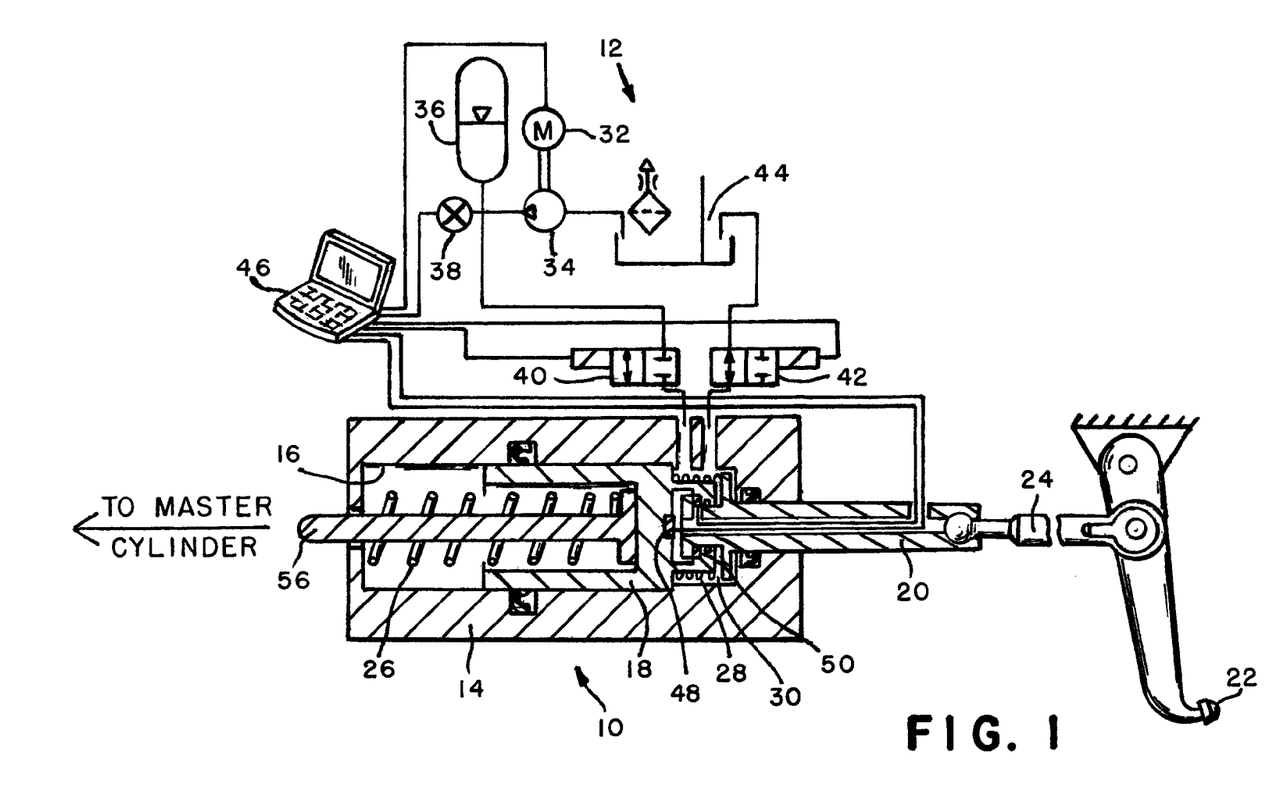
FIG. 1 is a schematic illustration of a brake system according to the invention with a partial cross-section of a piezoelectric hydraulic booster unit.
Figure 2:
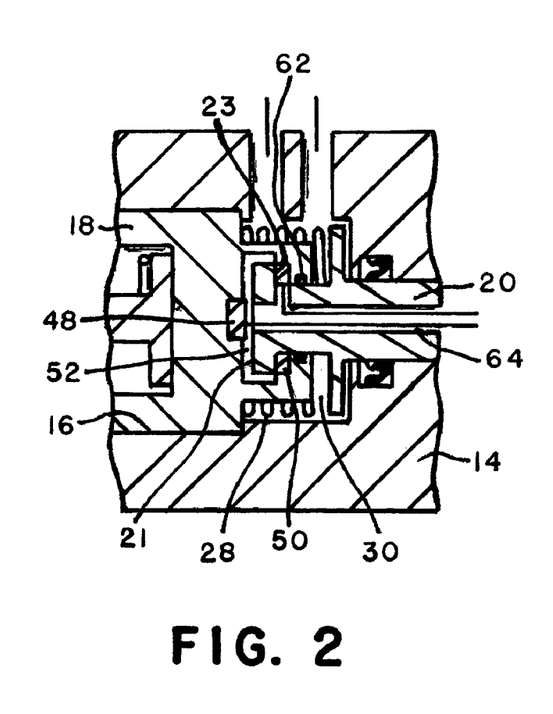
FIG. 2 is an enlarged view of a sensor region of the booster unit of FIG. 1 in a rest condition.
Figure 3:
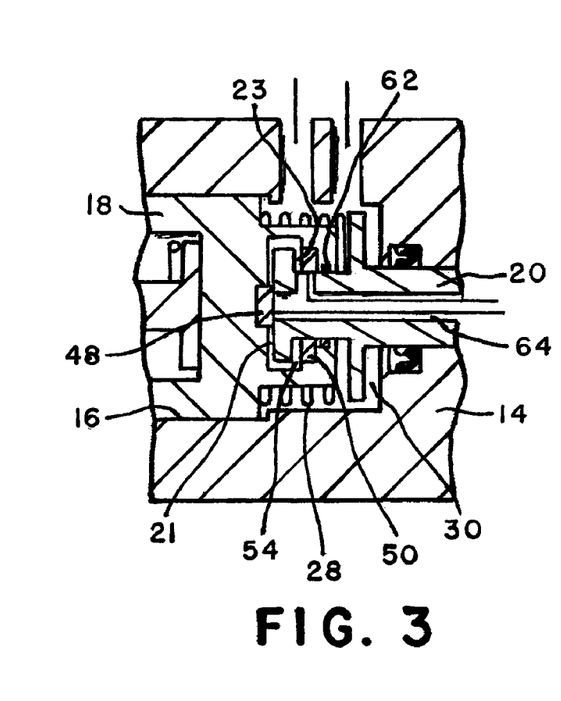
FIG. 3 shows the enlarged view of the sensor region of the booster unit of FIG. 1 in a braking condition.
Figure 4:
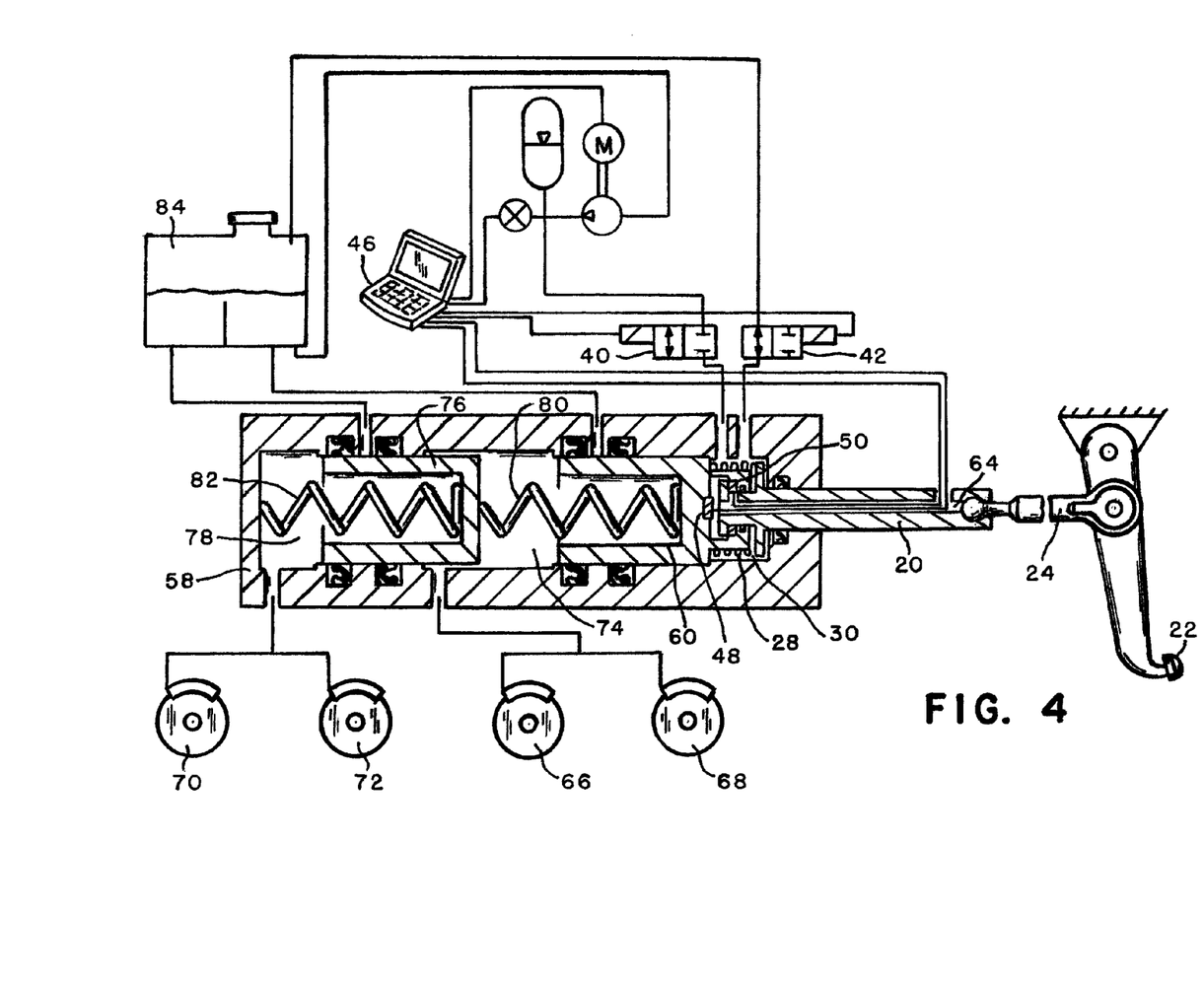
FIG. 4 is a schematic illustration of a brake system according to the invention with a partial cross-section of a piezoelectric combined hydraulic booster and a tandem master cylinder unit.
Figure 5:
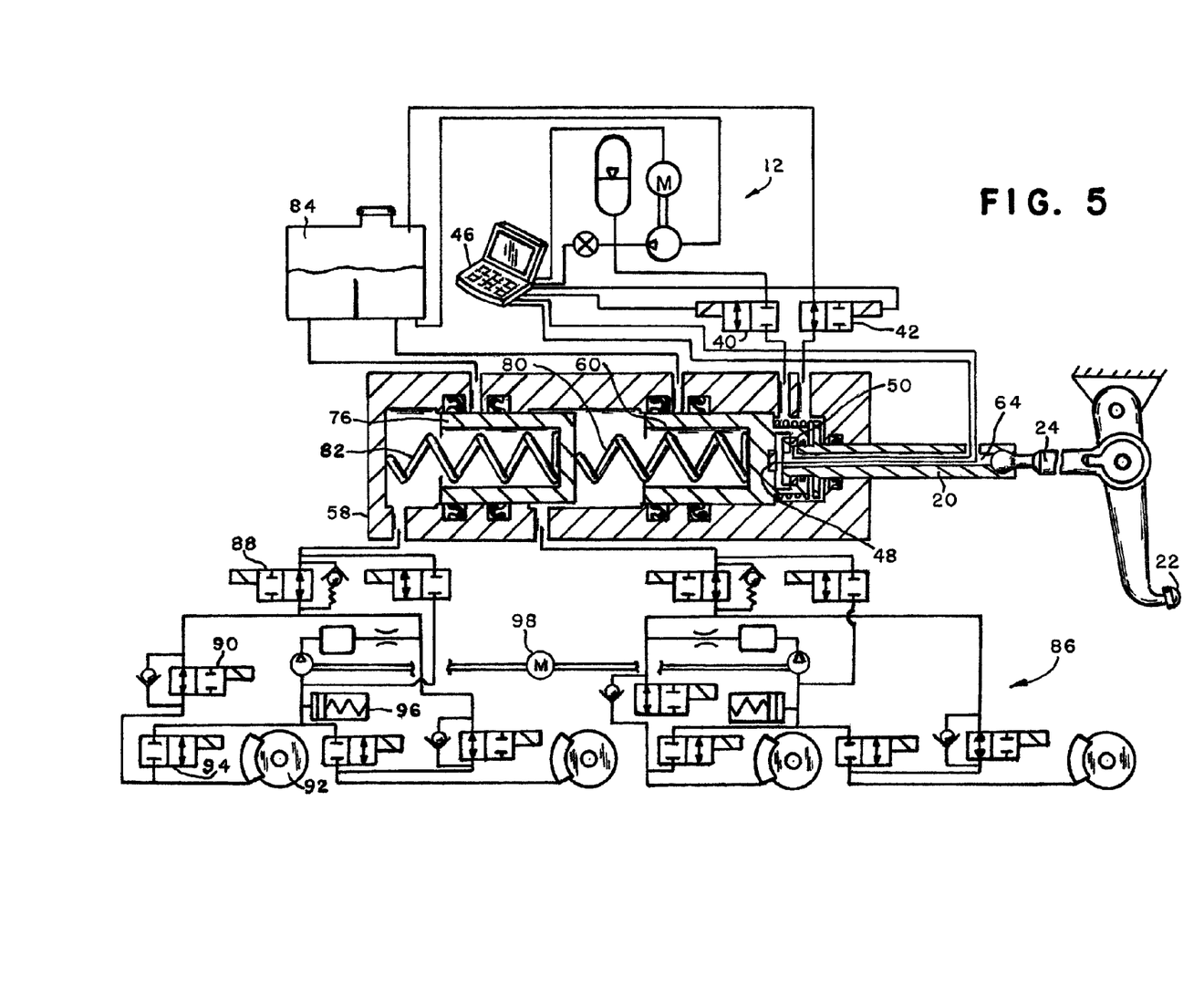
FIG. 5 is a schematic illustration of a brake system with a partial cross-section of the piezoelectric hydraulic booster and master cylinder unit of FIG. 2 for use to control an antilock braking arrangement.

Referring now to the drawings and particularly to FIG. 1, there is shown a hydraulic power boost unit 10 and a boost fluid pressure source such as energy unit 12. The boost unit or booster 10 includes a housing 14 having a cylindrical bore 16 with a boost piston 18 reciprocably disposed therein. An input member or rod 20 is coupled to an operator brake pedal 22 by a linkage 24 and is responsive to an operator pedal input to supply pressure fluid to individual wheel brake actuators such as illustrated in FIGS. 4 and 5. In an event that the boost unit 12 is inoperative, input member 20 moves piston 18 within bore 16 to provide an output member 56 with a force that is transmitted to a conventional master cylinder in much the same way as a vacuum failure mode in a brake system having a conventional vacuum booster. The cylindrical bore 16 retains a boost piston return spring 26, a cut in spring 28, and in conjunction with piston 18. Piston 18 is positioned within bore 16 to define a variable volume boost pressure chamber 30. The energy unit 12 functions as a fluid pressure source and includes an electric motor 32 that is driven by a hydraulic pump 34 to build and maintain a desired pressure in accumulator 36 and a reservoir 44. Line pressure is monitored by sensor 38 and a microprocessor defined by electronic control unit (ecu) 46 to control motor 32 and obtain and maintain a desired fluid pressure for energy unit 12. The electronic control unit 46 also monitors sensors 48 and 50 of the boost unit 10, as best shown in FIGS. 2 and 3, to selectively enables inlet valve 40 and outlet valve 42 accordingly. The inlet valve 40 and outlet valve 42 form an assembly that selectively supplies fluid pressure from the source or energy unit 12 to the boost pressure chamber 30 and vents fluid pressure from the boost pressure chamber 30 to reservoir 44. The input member 20 extends into the housing 14 and is coupled to the boost piston 18. The coupling includes the piezoelectric sensor arrangement 48 and 50 for detecting variations in the coupling between the input member 20 and the boost piston 18 as shown in greater detail in FIGS. 2 and 3.

FIG. 2 shows the input member 20 in a released position with a gap 52 between the front end 21 of the input member 20 and sensor 48 that is retained in boost piston 18. The rear face 23 of the front end 21 of input member 20 is urged into engagement with a piezoelectric sensor 50 by a cut in spring 28 that acts on input member 20 when no input is applied to pedal 22. A lost motion coupling or connection between input member 20 and piston 18 allows initial pedal depression to move input member leftward, and there is no corresponding motion of the boost piston 18 until gap 52 is spanned. FIG. 3 shows the relationship between the input member 20 and boost piston 18 when the operator has depressed pedal 22 and gap 52 has been replaced by a gap 54. Input member 20 is now urged into engagement with a piezoelectric sensor 48 by operator pedal input. The small chamber 31 wherein sensors 48 and 50 are located and where gaps 52 and 54 are created is isolated from the boost pressure chamber 30 by a seal 62, chamber 31 is connected to the atmosphere by passage 64 in which leads from sensors 48 and 50 are located and connected to the controller (ecu) 46.

In operation, at pedal apply, the cut in spring 28 will collapse and the input rod 20 rear face 23 of the front end 21 lifts off force sensor 50 and is urged toward and into engagement with force sensor 48. On engagement of the front end 21 of input rod 20 with force sensor 48, a corresponding force signal is sent to the controller (ecu) 46 which in turn sends an operational signal that closes the normally open valve 42 and opens the normally closed valve 40 to supply pressurized fluid from accumulator 36 to be presented and build up in the boost chamber 30. This pressurized fluid acts on and pushes the piston 18 in bore 16 toward a master cylinder until the following force balance is achieved. Balance between the force from the pedal 22 on the input rod 20 and the reaction force from the boost pressure on the input rod plus the bias of spring 28 and the pressure force on boost piston 18 and a reaction force on the output member (master cylinder actuating rod) 56 from the master cylinder plus the bias of spring 26. When a balance is achieved, the input rod 20 will be in a floating state between sensor 48 and sensor 50 and as a result no signals are transmitted from the sensors 48 and 50. In a balanced state, the controller 46 closes valve 40 and fluid pressure is maintained in the boost chamber 30. On release, the cut in spring 28 acts on input rod 20 to push the rear face 23 of the front end 21 against sensor 50 and a force signal is there after sent to the controller (ecu) 46 which in turn sends a signal to open the valve 42 and the fluid pressure in chamber 30 is released as fluid flows to reservoir 44. As disclosed in FIG. 1, sensors 48 and 50 are designed to only operate as On/Off switches.

In FIG. 4, the master cylinder and the power boost unit are combined in a common housing 58 and the boost piston 60 also functions as a master cylinder piston. The master cylinder portion of the brake system of FIG. 4 is illustrated as a split system with piston 60 providing braking fluid pressure from a variable volume chamber 74 to rear 66 and 68 wheel brake actuators. Pressure in chamber 74 urges piston 76 to reduce the volume of chamber 78 and this second braking circuit supplies braking fluid pressure to front 70 and 72 wheel brake actuators. Upon pedal release, two return springs 80 and 82 return the pistons to their rest positions. The boosted brake system of FIG. 4 includes a energy unit 12' that is similar to energy unit 12 of FIG. 1 with the exception of a fluid reservoir 84 that is shared by both the boost system and the master cylinder. It will be recognized that the piston 76, chamber 78 and spring 82 could be omitted and braking for all four wheels provided by a single master cylinder circuit.

Upon brake pedal operation, a force signal is sent from transducer 48 to the controller 46 which closes the valve 42 and opens the valve 40 to build up fluid pressure in the boost chamber 30 that pushes the primary piston 60 and with that the secondary piston 76. The primary piston 60 moves until the following two force balances (ignoring the return springs) are achieved. A balance occurs between the force from the pedal 22 on the input rod 20 and the reaction force from the boost pressure on the input rod. Further, a balance appears between boost pressure force on primary piston 60 and the reaction force from primary circuit. When a balance occurs, the input rod is in a floating position between sensor 48 and sensor 50 and as a result no signals are sent from sensors 48 and 50 to the controller or ecu 46. Without signals from sensors 48 and 50, controller 46 closes the valve 40 and fluid pressure is held and maintained in the boost chamber 30. At pedal apply, the cut in spring 28 collapse and the rear face 23 of the front end 21 of the input rod 20 lifts off force sensor 50 and pushes the front end 21 of input rod 20 into engagement with force sensor 48. On release, the cut in spring acts on the pushes the rear face 23 of the front end 21 of input rod 20 against force sensor 50 such that a force signal is sent to the controller (ecu) 46 which in turn sends a signal to open valve 42 and release fluid pressure from chamber 30 and allow return springs 80 and 82 of the master cylinder push the pistons 60 and 76 back into their initial or rest position. As with the embodiment of FIG. 1, the force sensors 48 and 50 of FIG. 4 operate only as On/Off switches.

The embodiment of FIG. 5 differs from FIG. 4 only in illustrating a hydraulically boosted brake system that could be used in conjunction with a conventional antilock braking system (ABS) 86 rather than the brake system of FIG. 4. Briefly, upon brake pedal actuation, fluid pressure is transmitted by way of a normally closed USV valve 88 and a normally closed EV valve 90 to the brake actuator of an illustrative front wheel 92. If the speed of wheel 92 drops excessively, EV valve 90 is closed and AV valve 94 opened to bleed some pressure fluid to accumulator 96 while local rebuild pressure is maintained by a motor 98 driving pump 100.

It is also possible to employ a single force sensor such as 48 to sense pedal apply and pedal release. Rather than operating as a simple On/Off switch, transducer 48 is adapted to provide a measure of the force applied to piston 18 or 60 by the input member. When the input rod 20 is fully released, the input force is decreasing, or the input member is urged away from the power boost piston, valve 42 is open and valve 40 is closed, both valves are in their normal or unenergized state. When the input rod force against the piston is steady, that is, their relative axial relationship remains constant, both valves 40 and 42 are closed and maintain the status quo. When the input member is urged toward the power boost piston and the input force increases, valve 42 is closed and valve 40 is open, that is, both are in their energized state and there is no need for a lost motion coupling between the input member 20 and the piston 60.

Figure 6:
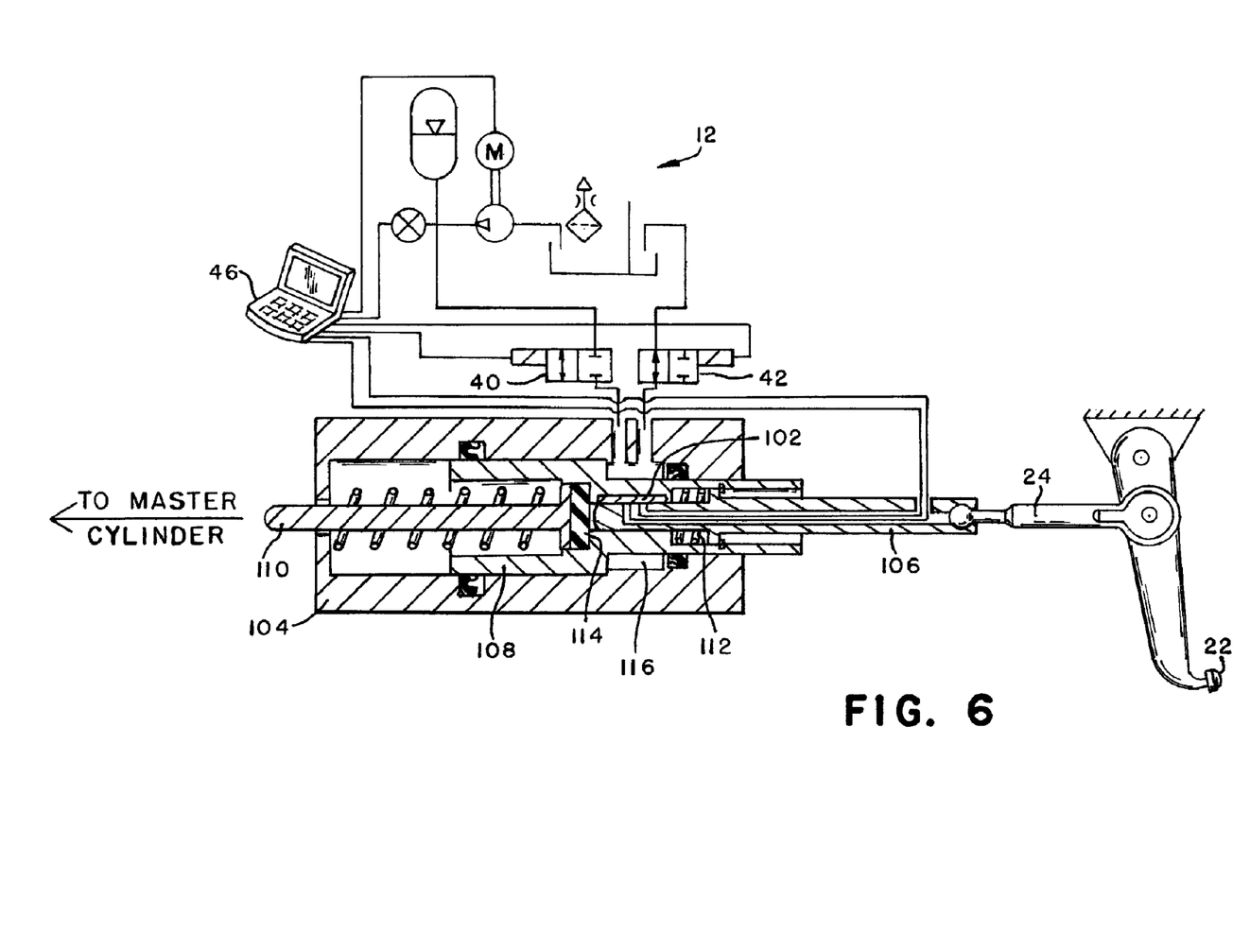
FIG. 6 is a schematic illustration of a brake system according to the present invention with a partial in cross-section of a travel sensing hydraulic booster unit.

FIG. 6 illustrates a variation on the brake system of FIG. 1. Basically the same energy unit 12 selectively supplies pressure fluid to the booster 210 by way of normally open valve 40 and relieves pressure by way of normally closed valve 42. Certain ones of the signals received by the electronic control unit 46 are of a different nature originating from a travel sensor 102 which may be a linear variable displacement transducer or other suitable sensor for detecting relative axial movement between the input member 106 and the piston 108. This travel sensor 102 measures the incremental travel between the input rod 106 and the boost piston 108. Even though both of these components are moving generally together during a booster stroke, there is also relative movement between them depending on the forces applied on the input rod 106 and the reaction forces coming from the booster 210. The structure of the housing 104, the input member 106, the boost piston 108 and the master cylinder actuating rod 110 have all been modified somewhat. Input member 106 is biased toward a retracted position relative to the piston 108 by cut in spring 112 and may be moved toward the left as viewed to directly engage a reaction disc or washer 114 allowing the same push through upon boost failure as discussed earlier. Boost pressure is selectively supplied to a variable volume chamber 116. At pedal apply, the cut in spring 112 will collapse and the input rod 106 will move toward the reaction washer 114. The travel signal from sensor 102 is sent to the controller 46 which closes the valve 42. Upon further travel of the input rod the valve 40 opens. Pressure builds up in the boost chamber 116 to push the piston 108 and actuating rod 110 toward the master cylinder. The piston 108 moves until a force balance between output rod 110, input rod 106 and piston 108 is achieved. The input rod will be in a floating position between open valve 40 (for further pressure increase) and open valve 42 (for pressure release). The controller 46 will close the valves 40 and 42. The pressure will be held in the boost chamber 116. On release, the cut in spring 112 will push the input rod into the released position. The travel signal is sent to the controller 46 which in turn sends a signal to open the valve 42 and release fluid pressure from chamber 116 of the booster 210. When the input rod 106 is fully released, valve 42 is open and valve 40 is closed and both valves are in their normal and unenergized state. When the input rod is partially applied by an input force, both valves 40 and 42 are closed to maintain the status quo. When the input rod is fully applied, valve 42 is closed and valve 40 is open, that is, both are in their energized state.

Figure 7:
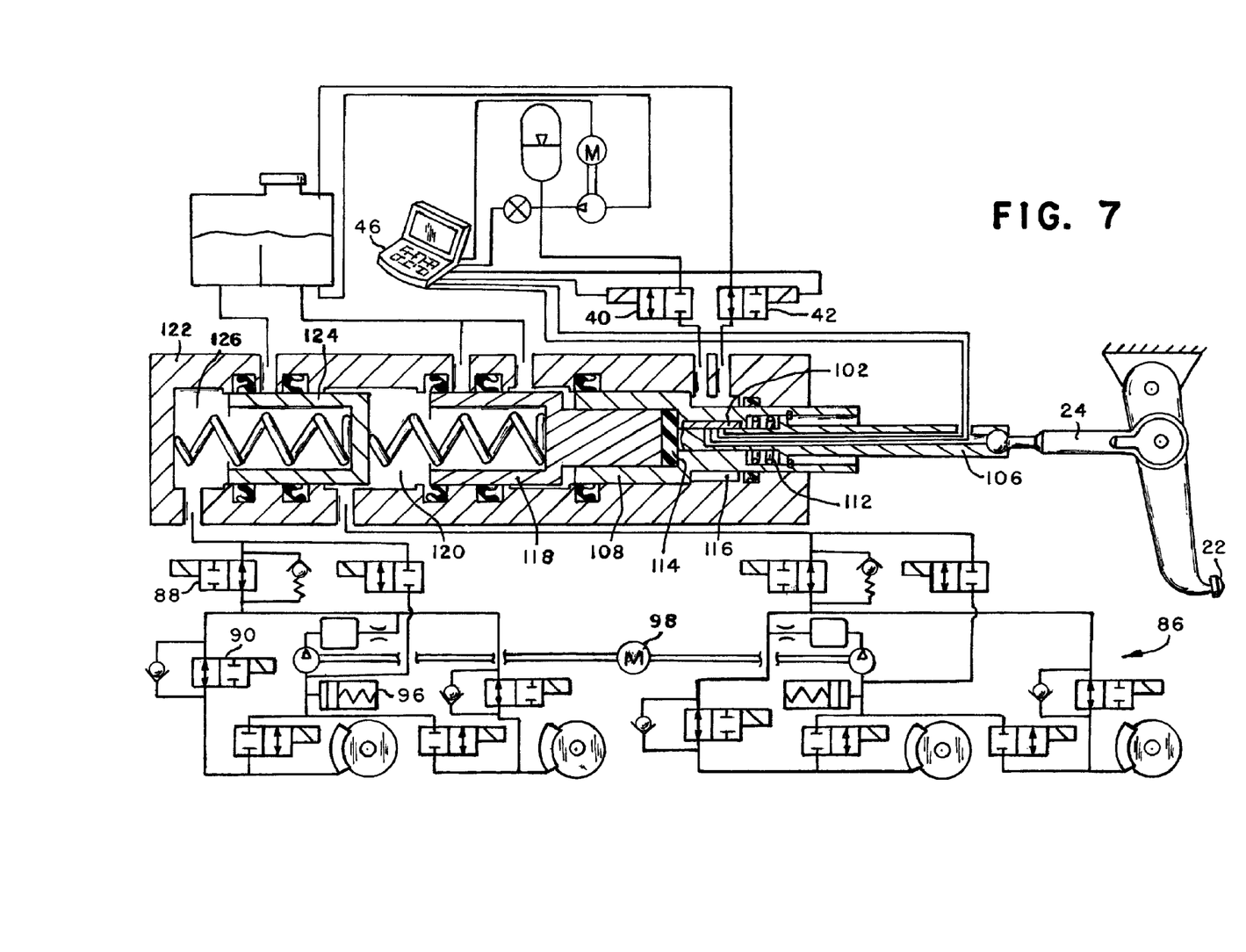
FIG. 7 is a schematic illustration, of a brake system according to the present invention with a partial cross-section, of a travel sensing combined hydraulic booster and master cylinder unit for use to control an antilock braking system.

FIG. 7 illustrates the sensing technique of FIG. 6 that combined in a single housing 122 with a split circuit master cylinder similar to that of FIGS. 4 and 5, however, the boost piston 108 is now coupled by reaction washer 114 to a primary master cylinder piston 118 upon brake pedal operation. Pressure building in chamber 120 causes translation of piston 124 and pressurization of chamber 126 and the braking pressure in these two chambers is conveyed to an ABS system as in the embodiment of FIG. 5.

What is claimed is:

1. A hydraulically boosted vehicle brake system, comprising:
   a plurality of individual wheel brake actuators;
   a master cylinder for supplying pressure fluid to at least an individual actuator of said plurality of individual wheel brake actuators;
   an input member responsive to an operator brake pedal operational input force for controlling the supply of pressure fluid to the actuators; and
   a power boost unit for selectively supplying boost pressure to the master cylinder, the power boost unit including
      a housing,
      a generally cylindrical bore within the housing,
      a boost piston reciprocably located within the bore and defining therewith a variable volume boost pressure chamber,
      a fluid pressure source,
      a valve assembly for selectively supplying fluid pressure from the source to the boost pressure chamber and venting fluid pressure from the boost pressure chamber, the input member extending into the housing and coupling to the boost piston, a sensor arrangement for detecting variations in the coupling between the input member and the boost piston, and an electronic control unit responsive to the sensor arrangement for controlling the valve assembly, wherein the input member and the boost piston are coupled to each other by a lost motion coupling configured to allow the input member to move axially in relation to the boost piston from between a brake released position and a brake applied position without causing the boost piston to move, wherein the boost piston defines a chamber, the chamber being isolated from the boost pressure chamber by a seal, wherein the input member includes a front end portion that is reciprocably retained within the chamber by the boost piston, wherein the front end portion of the input member includes a front face that faces toward the boost piston and a rear face that faces away from the boost piston, wherein the sensor arrangement includes a first sensor positioned in the chamber to be contacted by the front face of the front end portion of the input member when the input member is at the brake applied position, and wherein the sensor arrangement includes a second sensor positioned in the chamber to be contacted by the rear face of the front end portion of the input member when the input member is at the brake released position.

2. The hydraulically boosted vehicle brake system of claim 1, wherein the valve assembly includes a normally closed valve openable by the electronic control unit to supply pressure fluid from the source to the boost pressure chamber and a normally open valve closable by the electronic control unit to prevent release of pressure fluid from the boost pressure chamber.

3. The hydraulically boosted vehicle brake system of claim 2, wherein the sensor arrangement and electronic control unit cooperate to identify three distinct states of variation in the coupling between the input member and the boost piston, the three distinct states including a first state wherein the input member is at the brake applied position, a second state wherein the input member is at the brake released position, and a third state wherein the input member is intermediate the brake applied and the brake released positions.

4. The hydraulically boosted vehicle brake system of claim 3, wherein the electronic control unit is configured to control the normally closed valve and the normally open valve such that:

the normally closed valve is open and the normally open valve is closed when the input member is at the brake applied position, both the normally closed and the normally open valves assume their normal condition when the input member is at the brake released position, and both the normally closed and the normally open valves are closed when the input member is at an intermediate position between the brake applied and the brake released positions.

5. The hydraulically boosted vehicle brake system of claim 4, wherein the input member is configured to move to the brake applied position when the input force is increasing, wherein the input member is configured to move to the brake released position when the input force is decreasing, and wherein the input member is configured to move to the intermediate position when the input force is constant.

6. The hydraulically boosted vehicle brake system of claim 1, wherein the master cylinder and the power boost unit are combined in a common housing.

7. The hydraulically boosted vehicle brake system of claim 6, wherein the boost piston also functions as a master cylinder piston.

8. The hydraulically boosted vehicle brake system of claim 1, wherein the sensor arrangement includes a first and a second piezoelectric sensor and wherein the first piezoelectric sensor is configured to indicate whether the input member is at the brake applied position to identify an operator request for additional braking torque, and wherein the second piezoelectric sensor is configured to indicate whether the input member is at the brake released position to identify an operator request for reduced braking torque.

9. The hydraulically boosted vehicle brake system of claim 1, wherein the sensor arrangement includes a linear travel sensor configured to indicate a position of the input member relative to the brake applied position and the brake released position.

10. A hydraulically boosted vehicle brake system, comprising:

an operator controlled input member;
a master cylinder operable by the input member;
a source of pressure fluid;
a housing that defines a bore;
a power boost piston reciprocably located within the bore, the power boost piston and the housing cooperating to define a boost pressure chamber that is in fluid communication with the master cylinder, the power boost piston having a lost motion connection with the input member for enhancing operator applied force to the master cylinder, the lost motion connection permitting axial movement of the input member between a brake applied position and a brake released position in relation to the power boost piston without causing the boost piston to move;
a valve assembly for selectively supplying pressure fluid from the source to the power boost chamber;
a sensor arrangement for indicating when the input member is located at the brake applied position, the brake released position, and an intermediate position between the brake applied and the brake released positions in relation to the boost piston; and
an electronic control unit responsive to the sensor arrangement for controlling the valve assembly;
wherein the boost piston defines a chamber, the chamber being isolated from the boost pressure chamber by a seal,
wherein the input member includes a front end portion that is reciprocably retained within the chamber by the boost piston,
wherein the front end portion of the input member includes a front face that faces toward the boost piston and a rear face that faces away from the boost piston,
wherein the sensor arrangement includes a first sensor positioned in the chamber to be contacted by the front face of the front end portion of the input member when the input member is at the brake applied position, and
wherein the sensor arrangement includes a second sensor positioned in the chamber to be contacted by the rear face of the front end portion of the input member when the input member is at the brake released position.

11. The hydraulically boosted vehicle brake system of claim 10, wherein the sensor arrangement includes a first and a second piezoelectric sensor, wherein the first piezoelectric sensor is configured to indicate whether the input member is at the brake applied position to identify an operator request for additional braking torque, and wherein the second piezoelectric sensor is configured to indicate whether the input member is at the brake released position to identify an operator request for reduced braking torque.

12. The hydraulically boosted vehicle brake system of claim 10, wherein the sensor arrangement includes a linear travel sensor configured to indicate when the input member is at the brake applied position, the brake released position, and the intermediate position.

13. The hydraulically boosted vehicle brake system of claim 10, wherein the valve assembly includes a normally closed valve openable by the electronic control unit to supply pressure fluid from the source to the boost pressure chamber and a normally open valve closable by the electronic control unit to prevent release of pressure fluid from the boost pressure chamber.

14. The hydraulically boosted vehicle brake system of claim 10, wherein the electronic control unit is configured to control the normally closed valve and the normally open valve such that the normally closed valve is open and the normally open valve is closed when the input member is applied and pressed against the boost piston, both of the normally open and the normally closed valves assume their normal condition when the input member is released, and both of the normally open and the normally closed valves are closed when the input member is intermediate the applied and released conditions.

15. The hydraulically boosted vehicle brake system of claim 10, wherein the sensor arrangement includes a linear travel sensor that is located within the chamber to indicate when the front end portion of the input member is located at the brake applied position, the brake released position, and the intermediate position.

16. The hydraulically boosted vehicle brake system of claim 10, wherein the front end portion of the input member is biased into the brake released position.

17. The hydraulically boosted vehicle brake system of claim 10, wherein the input member defines a passage that connects the chamber to atmosphere, and wherein the electronic control unit is connected to the sensor arrangement by leads that are located in the passage.

* * * * *